United States Patent [19]
Beck et al.

[11] 4,209,779
[45] Jun. 24, 1980

[54] METHOD OF MONITORING EQUIPMENT AND SYSTEM FOR CARRYING OUT THE METHOD

[75] Inventors: Wolfgang Beck; Horst Herzog, both of Erlangen; Günter Stipsits, Neunkirchen, all of Fed. Rep. of Germany

[73] Assignee: Kraftwerk Union Aktiengesellschaft, Mülheim, Fed. Rep. of Germany

[21] Appl. No.: 890,287

[22] Filed: Mar. 27, 1978

[30] Foreign Application Priority Data

Mar. 28, 1977 [DE] Fed. Rep. of Germany ....... 2713640

[51] Int. Cl.² .............................................. G08B 21/00
[52] U.S. Cl. ....................................... 340/683; 73/658
[58] Field of Search ........................... 340/683; 73/658

[56] References Cited
U.S. PATENT DOCUMENTS

| | | | |
|---|---|---|---|
| 3,677,072 | 7/1972 | Weichbrodt et al. | 340/683 |
| 3,747,703 | 7/1973 | Knowd et al. | 340/683 |
| 4,087,801 | 5/1978 | Noh | 73/658 |

*Primary Examiner*—Glen R. Swann, III
*Attorney, Agent, or Firm*—Herbert L. Lerner

[57] ABSTRACT

Method of monitoring equipment wherein a measured value signal in the form of an electrical a-c signal is fed to the measuring channel of an electric circuit and a mean value output signal is formed by the electronic circuit in accordance with the amplitude of the measured value signal, which includes setting an amplitude limit as a function of the mean value signal and the amplitudes of the measured value signal, automatically adapting the amplitude limit with a predetermined time constant to changes in the mean value signal, setting a limit of a number of occurrences when the amplitudes of the measured value signal exceed the amplitude limit, and activating an alarm if the occurrence limit is surpassed within a settable time period, and system for carrying out the method.

9 Claims, 6 Drawing Figures

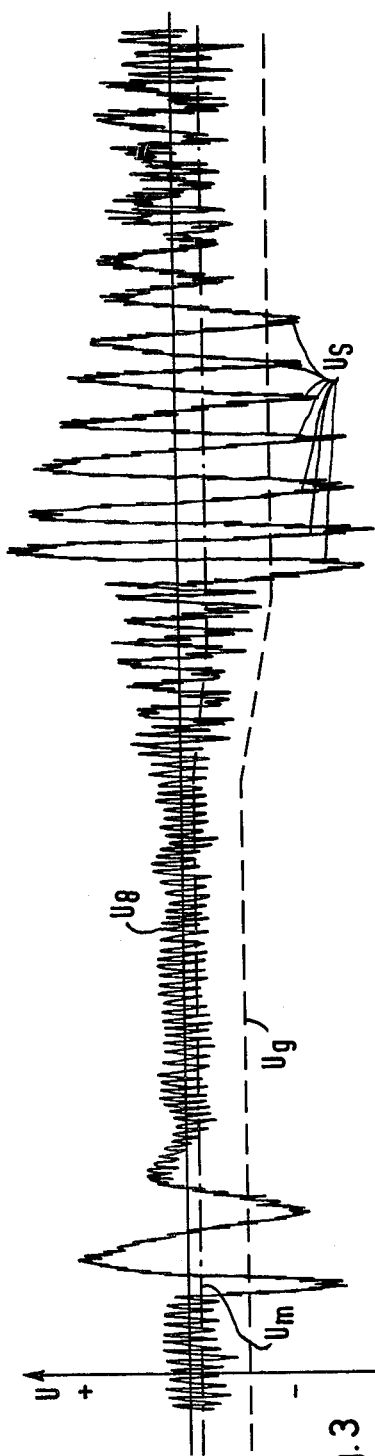
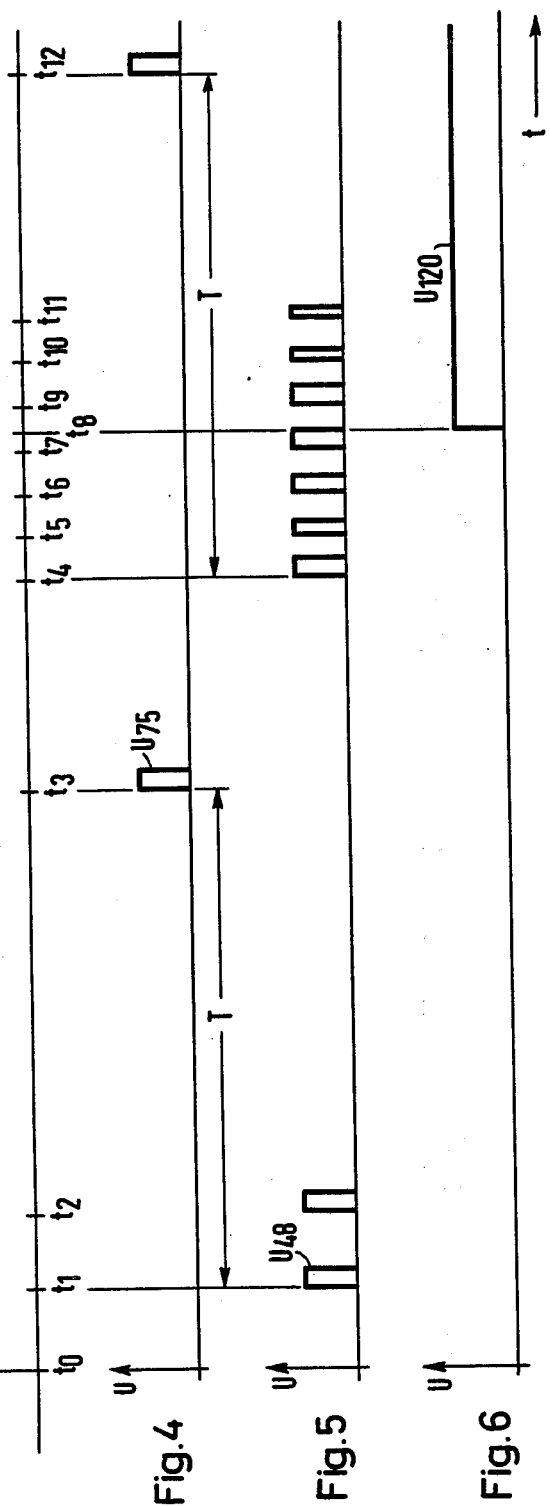
Fig. 3
Fig. 4
Fig. 5
Fig. 6

METHOD OF MONITORING EQUIPMENT AND SYSTEM FOR CARRYING OUT THE METHOD

BACKGROUND OF THE INVENTION

1. Field of the Invention

The invention relates to a method of monitoring equipment, particularly for monitoring solid-borne sound in the equipment, wherein a measuring value is fed as an electrical a-c signal to the measuring channel of an electronic circuit. The electronic circuitry forms an output signal as a function of the amplitude of the measuring value. The picked-up mechanical signal is converted by a transducer, such as a piezoelectric accelerometer, into the corresponding electric quantity and is in general fed to the measuring channel through a charge preamplifier and an active bandpass filter.

2. Description of the Prior Art

The accelerometers used for investigating mechanical vibrations are fastened to the object, the solid-borne sound of which is to be monitored. Mechanical vibrations caused by shock or other mechanical influences are converted by the accelerometers into electrical signals. In known solid-borne sound monitoring systems, pulses are released as soon as the signal exceeds an adjustable value. This leads to frequent false alarms because of picked-up electrical interference signals and the level fluctuations related to the operation.

SUMMARY OF THE INVENTION

It is therefore an object of the invention to provide a method of monitoring equipment and a system for carrying out the method which overcomes the aforementioned disadvantages of heretofore known systems and methods of this general type, in which the response value adapts itself automatically to the constantly changing basic operating level and in which at the same time interfering short pulses are suppressed.

With the foregoing and other objects in view, there is provided, in accordance with the invention, a method of monitoring equipment wherein, a measured value signal in the form of an electrical a-c signal is fed to the measuring channel of an electric circuit and a mean value output signal is formed by the electronic circuit in accordance with the amplitude of the measured value signal, which includes setting an amplitude limit as a function of the mean value signal and the amplitudes of the measured value signal, automatically adapting the amplitude limit with a predetermined time constant to changes in the mean value signal, setting a limit of a number of occurrences when the amplitudes of the measured value signal exceed the amplitude limit, and activating an alarm if the occurrence limit is surpassed within a settable time period.

In accordance with another mode of the invention, the method comprises amplifying the mean value signal formed from the measured value signal, comparing the amplified value signal with the measured value signal, forming counting pulses as a function of the difference between the amplified value signal and the measured value signal, and forming an alarm signal from the counting pulses.

In accordance with a further mode of the invention, the method comprises setting a number of counting pulses of the measured value signal, and forming the alarm signal as a function of the set number of counting pulses. From the measured value picked up as an electrical a-c quantity, a d-c value is formed first. Each half-wave of the measured value signal which exceeds the limit is registered. From these excesses over the limit, counting pulses are formed. As soon as a settable number of counting pulses is registered within the selectable time, an alarm signal is given. If the number of amplitudes set for releasing the alarm signal is not reached within the set time, then the counting and storing units are reset.

Further in accordance with the invention, there is provided a system for carrying out a method of monitoring equipment including an electronic circuit having a measuring channel to which a measured value signal in the form of an a-c signal is fed and a mean value output signal is formed by the electronic circuit in accordance with the amplitude of the measured value signal, the measuring channel including a rectifier, means connected to the rectifier for smoothing the output thereof, an adjustable-gain amplifier connected to the output of the rectifier, and a limit indicator following the amplifier and having an input to which a signal input is fed which is the difference between the output signal of the amplifier and the measured value signal, the system further including an electronic counter connected to the output of the limit indicator, means connected to the counter for resetting the counter, a decoder connected to the output of the counter and a memory connected to the output of the decoder.

The delay circuit is part of a resetting assembly which resets the counter after an adjustable time. Picked-up, transient interference signals therefore do not lead to the release of an alarm signal, which can be indicated optically and/or acoustically.

In accordance with another feature of the invention, the limit indicator includes an operational amplifier connected in an inverting circuit and a multivibrator connected to the output of the operational amplifier.

In accordance with an additional feature of the invention, there are provided means connected to the multivibrator for adjustably providing hysteresis. This hysteresis is obtained, for instance, by positive resistive feedback coupling of the operational amplifier.

In accordance with an added feature of the invention, the resetting means includes a monostable multivibrator having means for adjusting pulse width, and a pulse generator connected to the output of the monostable multivibrator.

In accordance with yet another feature of the invention, the pulse generator is another monostable multivibrator. The set pulse duration determines the time in which a predetermined count in the counter must be reached. After that time is reached the alarm of the monitoring system is released.

In accordance with concomitant feature of the invention, the pulse width adjusting means is an R-C circuit connected to the multivibrator.

BRIEF DESCRIPTION OF THE DRAWING

Other features which are considered as characteristic for the invention are set forth in the appended claims.

Although the invention is illustrated and described herein as embodied in a method of monitoring equipment, and system for carrying out the method, it is nevertheless not intended to be limited to the details shown, since various modifications may be made therein without departing from the spirit of the invention and within the scope and range of equivalents of the claims.

Figure 1:
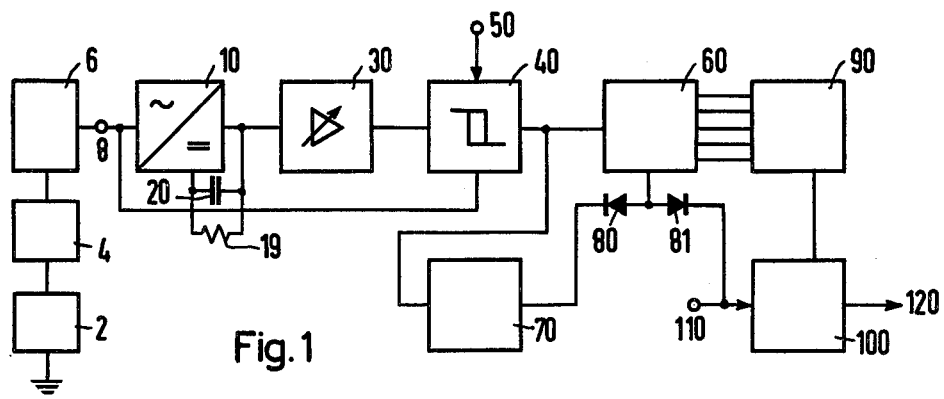
Figure 2:
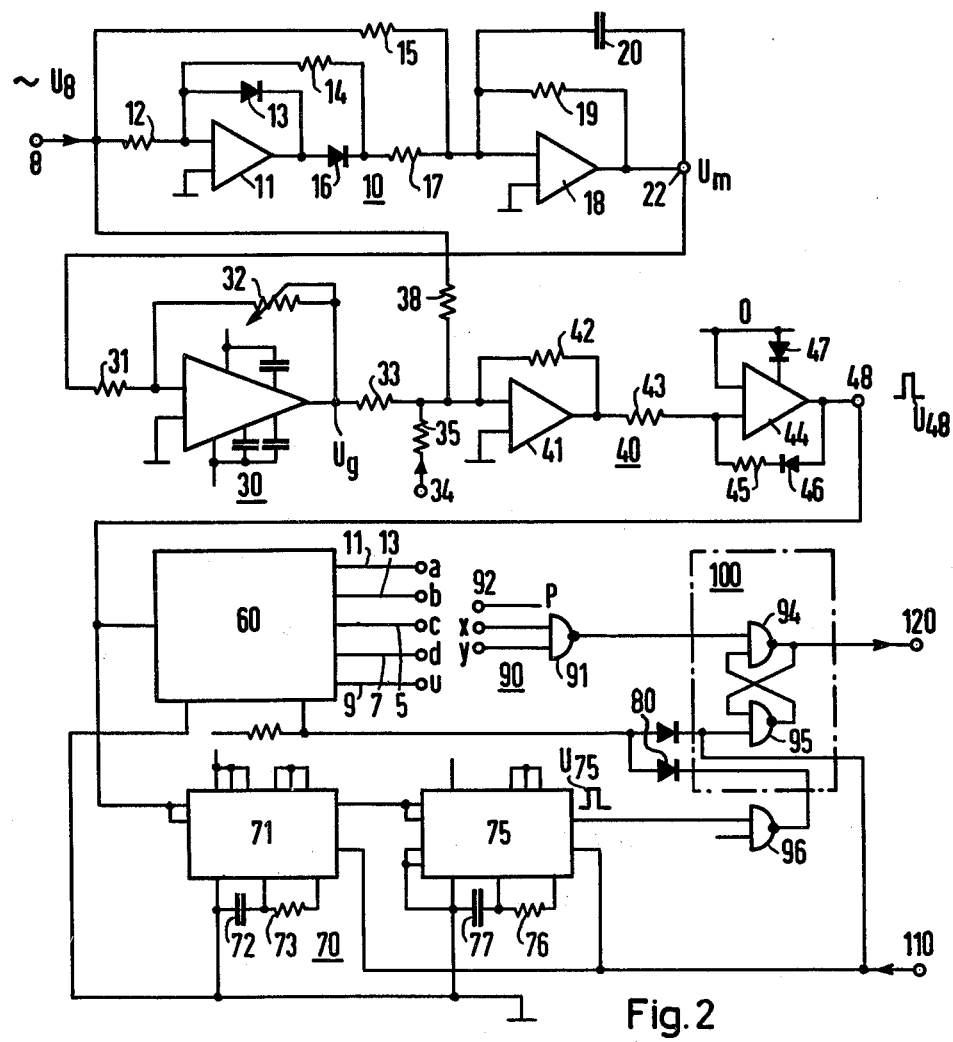

The invention, however, together with additional objects and advantages thereof will be best understood from the following description when read in connection with the accompanying drawings, in which:

FIG. 1 is a schematic block diagram of the monitoring system of the invention;

FIG. 2 is a schematic circuit diagram of the monitoring system of FIG. 1 in simplified form;

FIGS. 3 to 6 are plot diagrams of the operation of the monitoring system with the measured value (U) plotted along the ordinate and time (t) along the abscissa.

DESCRIPTION OF THE PREFERRED EMBODIMENT

Referring now to the figures of the drawing and first particularly to FIG. 1 thereof, it is seen that a measured solid-borne sound value is fed by an accelerometer 2 as an electrical a-c quantity through a charge preamplifier 4 and an active bandpass filter 6 to the input 8 of a measuring channel. The measuring channel contains a precision rectifier 10 which is effective for very small as well as larger voltages, through the use of a filter in the feedback path. The filter includes a capacitor 20 shunted by a resistor 19, as well as an amplifier 30 with continuously variable gain and a limit indicator 40. The input signal of the rectifier 10 is also fed to the limit indicator 40. The limit indicator 40 may advantageously further be provided with a signal input 50 for operating blocking inputs. The limit indicator 40 forms counting pulses in dependence on the sign of the difference between the amplified mean value and the measured value, if the negative amplitude of the measured value exceeds the limit set in the limit indicator 40; these pulses are fed to a counter 60 and a resetting assembly 70. A decoder 90 is associated with the counter 60. After a settable number of counting pulses, the decoder 90 forms an output signal which is fed to a memory 100. The output signal of the resetting assembly 70 acts, through decoupling diodes 80 and 81, simultaneously on the decoder 90 and the memory 100. The memory 100 can be reset at a separate input 110. A conventional alarm device, now shown in the figure, is actuated by the signal at the output 120.

The input voltage is rectified by the rectifier 10 and smoothed by the time constant formed by the capacitor 20 and the resistor 19, so that the mean value of the input voltage is present at the input of the amplifier 30. The amplified mean value appearing as the output voltage of the amplifier 30 is compared in the limit indicator 40 with the measured value present at the input 8 of the measuring channel. The output pulses of the limit indicator 40 drive the counter 60.

For each negative half-wave of the measured value at the input 8 which exceeds the output voltage of the amplifier 30, a positive pulse is generated by the limit indicator 40. These pulses are summed by the electronic counter 60, which may preferably be a binary counter. Upon reaching a chosen count, which can be varied by the decoder 90, the memory 100 is set. Simultaneously, an output signal can be given, which either merely leads to a registration or only indicates the disturbance, for example, by a light signal, connected to the output 120, or also through a separate output not illustrated in FIG. 1.

The output signal of the limit indicator 40 is simultaneously fed to the resetting assembly 70 which resets the counter 60 after an adjustable time.

The series-connected bandpass filter 6 filters out the operating noise which is not to be picked up by the monitoring system. For example, frequencies up to 600 Hz and above 10 kHz may be filtered out. In the embodiment of the measuring channel according to FIG. 2, the a-c signal $U_8$, having a frequency which is in the range, for example, of 0.6 to 10 kHz, is fed through the input 8 to the full-wave rectifier 10, which contains an operational amplifier 11 with an input resistor 12, a diode 13 and a resistor 14. The output line of the amplifier 11 contains a diode 16 and a resistor 17. In shunt with the amplifier 11 is a current path which contains a resistor 15. The amplifier 11 is followed by a further operational amplifier 18 which is provided with a smoothing member formed of a smoothing resistor 19 and a smoothing capacitor 20.

The resistor 17 receives the negative half-waves of the a-c input voltage via the amplifier 11 and the diode 16. Simultaneously, the unmodified input voltage is fed to the input of the amplifier 18 through the line containing the resistor 15. Through this conventional circuit connection of the two amplifiers, full-wave rectification is obtained with a negative output signal, which is smoothed by the R-C feedback of the resistor 19 and the capacitor 20, so that the mean value $U_m$ of the measured value appears at the output of the rectifier 10. This output signal corresponds to the basic noise level which is still passed by the bandpass filter after it has filtered out the normal operating noise, the frequencies of the noise being outside its passband. This output signal is fed via the input resistor 31 to the amplifier 30. The gain of the amplifier 30 is settable by means of a resistive negative feedback with a variable resistor 32.

Through this gain, which can be set at the resistor 32, the limit it set with a noise margin which advantageously corresponds to a multiple of, for example, five times the magnitude of the mean value $U_m$ of the measured signal $U_8$. This signal is fed through a resistor 33 to an amplifier 41 of the limit indicator 40, to which the input signal from the input 8 is also fed through a resistor 38. The two input signals are added in the amplifier 41, which may preferably be an operational amplifier with inverting input. Added to the positive signal at the resistor 33 is the signal of alternating polarity at the resistor 38. The amplifier 41 equipped with a feedback resistor 42 feeds the sum signal through a resistor 43 to the amplifier 44, connected as a multivibrator. The output signal at the resistor 43 actuates a switch, which may preferably be an electronic multivibrator with an amplifier 44. This multivibrator can be given an adjustable hysteresis by means of a resistive feedback 45 in series with a diode 46.

The counting pulses $U_{48}$ formed at the output 48 of the limit indicator 40 are fed to the counter 60 of a register device, the binary outputs a to u of which can be interrogated by inserting jumpers to the inputs x and y of an NAND gate 91, which forms the decoder 90. The power supply of the logic circuit is chosen so that the potential of the signals formed can alternate between an H-signal (high) with a voltage of at least 7.5 V, and an L-signal (low), with a voltage of not more than 4.5 V. When the binary counter content set by the jumpers is reached, the output of the decoder 90 gets an L-signal and the gates 94 and 95, acting as a memory 100, are set. The output 120 furnishes an alarm signal that can be used in general merely for actuating an alarm and in exceptional cases, for further processing in subsequent facilities.

The output signal of the limit indicator 40 is also fed to the resetting assembly 70 which contains a monostable multivibrator 71, the pulse duration or width of which can be set by means of an R-C circuit. The R-C circuit includes a resistor 73 and a capacitor 72. A further monostable multivibrator 75 acts as a pulse generator, which is followed by an electronic inverter for inverting the signal. The pulse generator 75 is likewise provided with R-C circuitry containing a resistor 76 and a capacitor 77. The counter 60, the resetting assembly 70 and the memory 100 can be reset by means of an input 110 which serves to cancel the alarm.

At the end of the output pulse of the multivibrator 71 i.e. with the falling flank of the output pulse, the following multivibrator 75 delivers a short pulse. The first multivibrator 71 thus acts as a delay member with adjustable delay. The output pulse $U_{75}$ of the multivibrator 75 resets the counter 60 to zero through the inverter stage 96 and a decoupling diode 80. This resetting of the counter 60 thus always becomes effective after the delay time set by the resistor 73, if the measured value $U_8$ of the disturbance signal exceeds the limit $U_g$. The delay time may be, for example, 2 to 5 ms.

If disturbance signals are expected, in order to prevent an alarm signal, a positive voltage, which acts to block the limit, can further be applied to the input of the amplifier 41. This blocking voltage is fed-in at a terminal 34 and through a resistor 35. It blocks the limit indicator 40 and, for all practical purposes takes the monitoring device out of operation. This is done if, for example, operating noises are expected for a short time as disturbance signals and the frequency of the disturbance signals is within the frequency range covered by the monitoring system. This is the case, for example, during the motion of control rods of a nuclear reactor.

For decoding, a jumper is inserted between the inputs x and y and one of the respective outputs a to u of the counter 60. If both of these outputs are positive, then the gate 91 delivers an L output signal. The jumper can also be set between one of the inputs x and y and the terminal 92 which is at a positive potential. Then, only the other input needs an H-signal from one of the outputs a-u, respectively to release an alarm signal at the output 120 of the system. Since the outputs are assigned to different counter stages, almost any pulse numbers in a predetermined numbers range e.g. between 1 and 15, can be determined that should lead to the release of a signal at the output 120.

In the plot diagram of FIG. 3, the measured value $U_8$ and the mean value $U_m$ as well as the limit value $U_g$ are plotted against time t. By means of the feedback resistor 32, a value of the limit $U_g$ is chosen which the disturbance signal must exceed if an alarm signal is to be released at the output 120. This limit value $U_g$ indicated by a broken line, is set, for example, to 5-times the magnitude of the mean value $U_m$ of the d-c voltage supplied by the rectifier 10. At the time $t_0$, the amplitude of the measured value $U_8$ at the input 8 is considerably smaller than the set limit $U_g$. At the time $t_1$, a disturbance signal exceeds the limit $U_g$ in the form of a damped oscillation. The oscillation may be caused, for example, as a transient of the bandpass filter 6 when a power circuit breaker is switched. The disturbance causes the limit indicator 40 to generate a counting pulse $U_{48}$ at the output 48 as an H-signal. The H-signal increases the content in the counter 60 by 1 and triggers the delay stage 71 of the resetting assembly 70. The following negative half-wave again triggers a pulse at the time $t_2$, while the further amplitudes have become reduced and are already smaller than the set limit $U_g$.

As seen in FIG. 4, at the end of the delay time T set by the resistor 73 of the delay stage 71, the counter 60 is reset at the time $t_3$ by the pulse generator 75 with a resetting pulse $U_{75}$ which reaches the counter 60 through the inverter stage 96. The mean value $U_m$ was practically unchanged by the short disturbance pulse. It is now seen that it is a particular advantage of the method according to the invention that the limit $U_g$ adapts itself automatically to a change of the mean value $U_m$. If, for example, at the time $t_3$, the mean value is increased, the limit $U_g$ is increased correspondingly and remains at the set multiple magnitude of the mean value $U_m$, so that a corresponding disturbance is necessary to set off an alarm.

At the time $t_4$, a disturbance occurs which leads to the release of an alarm signal. At the times $t_4$, $t_5$, $t_6$ and $t_7$, the amplitudes of the vibration of the disturbance signal exceed the limit $U_g$ set at the coupling resistor 32 and therefore release, according to FIG. 5, corresponding counting pulses $U_{48}$, which are registered by the counter 60. The number of pulses selected by the use of conventional non-illustrated jumpers between the outputs a to u of the counter 60, and the positive potential at the point 92 and the inputs x and y of the decoder 91, may be four, for example. In that case, after the 4th counting pulse, at the time $t_8$, the output 120 flips from an L-signal to an H-signal and thereby releases an alarm signal $U_{120}$, as can be seen from the plot diagram of FIG. 6.

At the end of the delay time T set at the delay stage 71, the counter 60 is reset by the pulse $U_{75}$.

In the embodiment of the invention illustrated in FIGS. 1 to 6, a solid-borne sound monitoring system was chosen. However, the method according to the invention can also be used, for example, for monitoring a line, for monitoring in fracture mechanics, for monitoring for slack or loose parts as well as for monitoring cracks and also vibration monitoring of a system. This is so because the input signal $U_8$ at the input 8 of the electronic circuit can be taken from any measuring transducer which furnishes a measured a-c voltage value, of which the number and magnitude of the amplitudes are to be registered and, if desired, are to release an alarm signal.

Examples of readily available components of the system according to the invention are as follows:

The bandpass filter 6 is an 8-pole bandpass with "Butterworth" characteristic and difference input amplifier, Gain 1, constructed with 9 amplifiers of the TBA 221 type, manufactured by Siemens Corporation, Germany.

The rectifier 10 is an ideal rectifier with mean value formation, Gain 1, constructed with 2 amplifiers, type TBA 221 S1 of Siemens, and 2 diodes type BAW 76 of Siemens.

The amplifier 30 is a direct voltage amplifier, Gain 0÷50 with helipot adjustable, constructed with 1 amplifier type HA 2904 manufactured by Harris Corporation, U.S.A.

The limit indicator 40 is a limit value stage, output LSL-signal, constructed with 1 amplifier type TBA 221 of Siemens, 1 amplifier type LM 301 manufactured by National-Semiconductors U.S.A., 1 diode type AAY 25 Siemens, and 1 Zener diode type BZ×97 of Siemens.

The counter 60 is a binary counter, output LSL-signal, type FZJ 151 of Siemens.

The resetting assembly 70 is a resetting circuit, output LSL signal, constructed with 2 Time Delay stages, type FZK 101 of Siemens, 1 Nand Gate FZH 101 of Siemens.

The multivibrators 71 and 75 are included in the resetting assembly 70.

The decoder 90 is a decoder, output LSL signal, constructed with 1 Nand Gate FZH 101 of Siemens, with selected counting rate adjustable by wire bridges.

The memory 100 is a memory, output LSL signal, constructed with 2 Nand Gates type FZH 101 of Siemens, and 2 diodes type SSD 55 of Siemens.

There are claimed:

1. Method of monitoring equipment wherein a measured value signal in the form of an electrical a-c signal is fed to the measuring channel of an electric circuit and a mean value output signal is formed by the electronic circuit in accordance with the amplitude of the measured value signal, which comprises setting an amplitude limit as a function of the mean value signal, automatically adapting the amplitude limit with a predetermined time constant to changes in the mean value signal, setting a limit of a number of occurrences amplitudes of the measured value signal exceeding the amplitude limit, and activating an alarm if the occurrence limit is surpassed within a settable time period.

2. Method according to claim 1, wherein activating the alarm includes amplifying the mean value signal formed from the measured value signal, comparing the amplified value signal with the measured value signal, forming counting pulses as a function of the difference between the amplified value signal and the measured value signal, and forming an alarm signal from the counting pulses.

3. Method according to claim 2, wherein forming the alarm signal includes, setting a number of counting pulses of the measured value signal, comparing the set number of counting pulses to the number of formed counting pulses and forming the alarm signal if the counted pulses exceed the set number.

4. System for carrying out a method of monitoring equipment according to claim 1 comprising an electronic circuit having a measuring channel to which a measured value signal in the form of an a-c signal is fed and a mean value output signal is formed by the electronic circuit in accordance with the amplitude of the measured value signal, said measuring channel comprising a rectifier, means connected to said rectifier for smoothing the output thereof, and an adjustable-gain amplifier connected to the output of said rectifier, the system further comprising a limit indicator following said amplifier and having an input to which is fed the output signal of said amplifier and said measured value signal, said limit indicator forming a counting pulse output in dependence on the sign of a difference between the output signal of said amplifier and said measured value signal if the amplitude of said measured value signal exceeds a limit set in said limit indicator, an electronic counter receiving said counting pulse output of said limit indicator, means connected to said counter for resetting said counter, a decoder connected to the output of said counter for issuing an output signal after a settable number of counting pulses have been received by said counter, and a memory connected to the output of said decoder for issuing an alarm signal after receiving said output signal of said decoder.

5. System according to claim 4, wherein said limit indicator includes an operational amplifier connected in an inverting circuit and a multivibrator connected to the output of said operational amplifier.

6. System according to claim 5, including means connected to said multivibrator for adjustably providing hysteresis.

7. System according to claim 4, wherein said resetting means includes a monostable multivibrator having means for adjusting pulse width, and a pulse generator connected to the output of said monostable multivibrator.

8. System according to claim 7, wherein said pulse generator is another monostable multivibrator.

9. System according to claim 7, wherein said pulse width adjusting means is an R-C circuit connected to said multivibrator.

* * * * *